A. RASMUSEN, Jr.
GASOLENE ENGINE.
APPLICATION FILED JUNE 1, 1916.

1,240,366.

Patented Sept. 18, 1917.
2 SHEETS—SHEET 1.

Witnesses

Inventor
Andrew Rasmusen Jr.

By
Attorneys

A. RASMUSEN, Jr.
GASOLENE ENGINE.
APPLICATION FILED JUNE 1, 1916.

1,240,366.

Patented Sept. 18, 1917.
2 SHEETS—SHEET 2.

Inventor
Andrew Rasmusen Jr.

Witnesses

By
Attorneys

UNITED STATES PATENT OFFICE.

ANDREW RASMUSEN, JR., OF RIDGWAY, COLORADO.

GASOLENE-ENGINE.

1,240,366.

Specification of Letters Patent. Patented Sept. 18, 1917.

Application filed June 1, 1916. Serial No. 101,094.

*To all whom it may concern:*

Be it known that I, ANDREW RASMUSEN, Jr., a citizen of the United States, residing at Ridgway, in the county of Ouray, State of Colorado, have invented a new and useful Gasolene-Engine; and I do hereby declare the following to be a full, clear, and exact description of the invention, such as will enable others skilled in the art to which it appertains to make and use the same.

This invention relates to the art of engines, and more particularly to what is known as a rotary internal combustion engine of that type in which motion to the rotor is imparted by an overshot charge from the combustion chamber.

One of the objects of the invention is to provide an engine of this particular type having improved features of construction of efficient and practical design.

One of the features of construction is the provision of a rotor provided with pockets intermediate the intake charge pockets of the rotor to act as connecting links between the intake manifold pipe and the charge storage or combustion chamber in advance of the intake charge pockets, so as to inject the charge into the charge storage or combustion chamber, where it is fired about the time the charge pockets of the rotor register with a passage from said combustion chamber.

Another feature of the invention is that the connecting link pockets also gather portions of the utilized gases so that they will exhaust through the exhaust manifold pipe.

Still another feature of the invention is that the intake charge pockets act as means to convey the greater portion of the utilized gases so as to exhaust out through the exhaust manifold pipe.

In practical fields the details of construction may necessitate alterations falling within the scope of what is claimed.

The invention comprises further features and combinations of parts, as hereinafter set forth, shown in the drawings and claimed.

In the drawings:—

Figure 1:
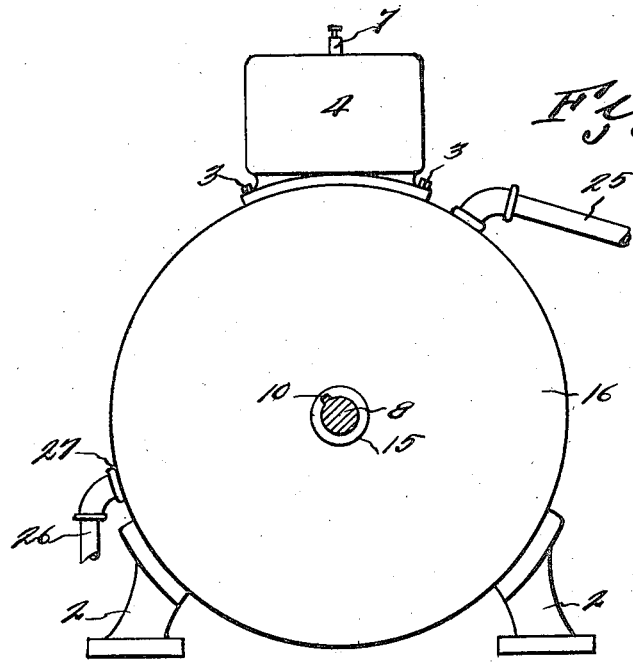
Figure 1 is a view in side elevation of the improved rotary internal combustion engine constructed in accordance with the invention.

Referring more especially to the drawings, 1 designates a cylindrical casing which is provided with supporting legs 2, which may be bolted or otherwise secured to a suitable foundation or other stationary support. Bolted to the upper part of the casing 1 by means of the bolts or screws 3 is an auxiliary casing 4 having a charge containing chamber 5, there being a suitable water space or jacket 6 which surrounds the chamber 5 substantially. Secured in the upper wall of the auxiliary casing 4 in any suitable manner is the usual spark plug 7.

A drive shaft 8 is provided, to be driven by the rotor 9, which is revolubly mounted in the casing 1 and is connected to rotate with the shaft 8, by means of the spline or feather 10.

Figure 2:
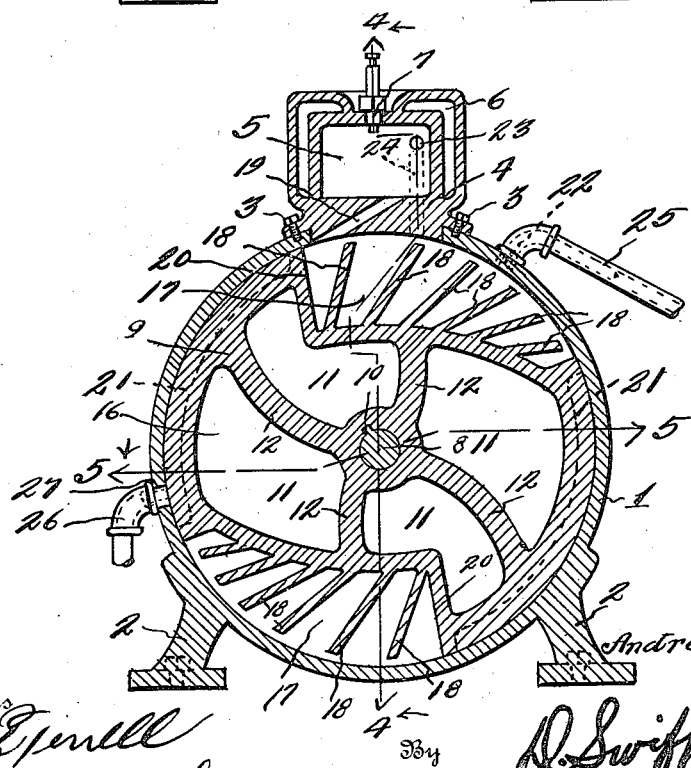
Fig. 2 is a vertical sectional view.
Figure 3:
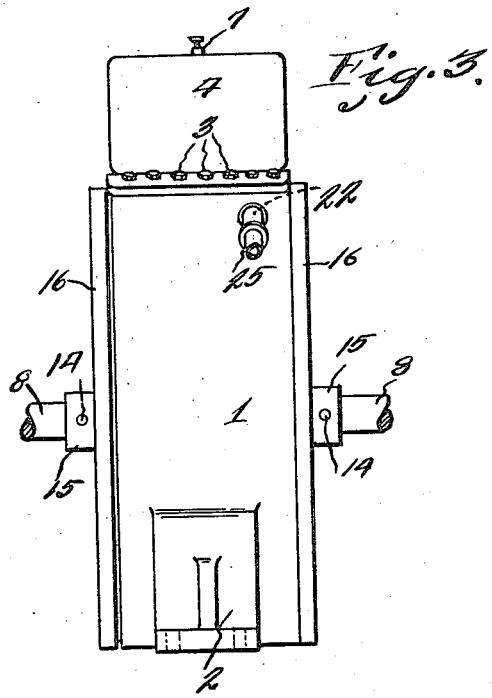
Fig. 3 is an edge view.
Figure 4:
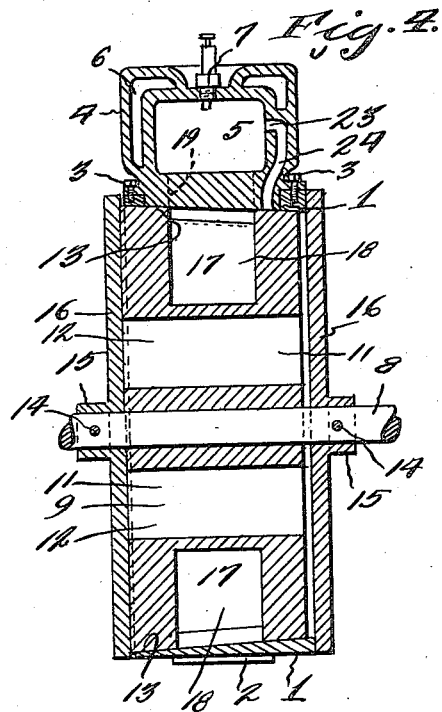
Fig. 4 is a sectional view on line 4—4 of Fig. 2.
Figure 5:
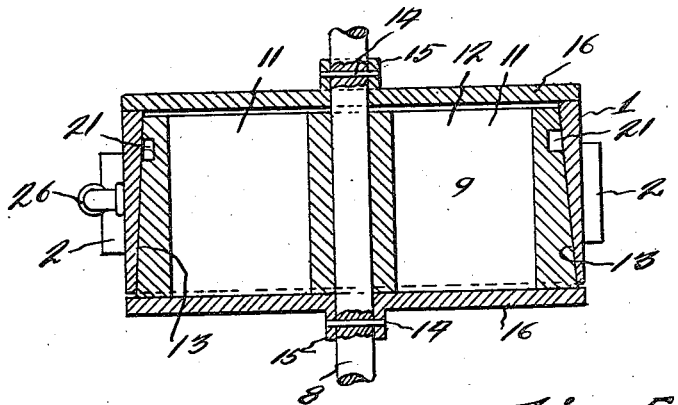
Fig. 5 is a transverse sectional view on line 5—5 of Fig. 2.

This rotor, as shown in Fig. 2, is considerably lightened or reduced in weight by being cut-away, as shown at 11, thereby leaving the spokes 12, thereby providing a skeleton rotor.

It will be seen that the annular periphery of the rotor is partly tapered, as shown at 13, so as to engage a corresponding tapered annular surface of the interior wall of the casing 1, so that as the rotor revolves a ground seat is insured. Fixed or keyed by means of the pins 14 to the shaft 8, are the hub portions 15 of the side plates 16, which have their peripheral edge portions overlying the side edges of the casing, thereby holding the rotor in place. The wall of the rotor at diametrically opposite points is depressed, thereby forming charge intake pockets 17 of the shape shown. Arranged in the pockets 17 are pluralities of blades 18, the blades of each plurality being disposed upon different angles to the passage 19 leading from the chamber and on an angle and to the interior surface of the casing 1, so that as the charge expands subsequently to its firing and against the wall 20 of the pockets 17 and against the blades 18, the rotor will be given revoluble movement.

The rotor at diametrically opposite points, at right angles to the positions or locations of the pockets 17, is provided with elongated pockets 21. However, these pockets are disposed to one side of the pockets 17. In other words, the pockets 21 are in a plane to one side of the pockets 17, so as to register with the port 22 of the intake manifold pipe, as the rotor revolves. One wall of the auxiliary casing 4 is provided with a port 23 and a passage 24 leading from the port 23. This passage 24 opens into the interior of the casing 1, to one side of the plane in which the pockets 17 travel, and in a line with the plane in which the pockets 21 travel, and in alinement with the port 22 of the intake manifold pipe 25. It is to be noted that when the rotor is under revoluble movement, the pockets 21 will act as connecting links or passages between the port 22 and the passage 24, thereby permitting a charge to enter the chamber 5, where it is ignited. The expanding gases subsequent to firing of the charge, pass through the passage 19 and act against the walls 20 and the blades 18, thereby imparting movement to the rotor. The exhaust manifold pipe 26 is fixed in the casing 1, as shown at 27, so as to be in alinement with the pockets 17, to exhaust the utilized gases.

It will be seen that the tapered shape of the rotor and the corresponding tapered shape of the interior of the stator afford means for taking up the wear on either part and maintaining always a close relationship between the walls of the rotor and the stator. Of course, the wear between the two parts is compensated for by shifting the stator along its shaft, the limit of this shifting being the point where no part of pocket 21 will register with the port 22 or with the passage 24.

The invention having been set forth, what is claimed as new and useful is:—

1. In a rotary engine, the combination of a main casing and an auxiliary casing having a motive power chamber, of an intake manifold in communication with the interior of the main casing, a shaft, a rotor carried by the shaft and mounted revolubly in the main casing, said rotor having diametrically oppositely disposed intake pockets provided with an abutment wall and a plurality of abutment blades arranged at different angles to each other, the foremost blades being nearly vertical with the bottom of the pockets and each succeeding blade inclining more toward the bottom of the pockets with the angle of inclination of the last blades being the most acute, said motive power chamber having two passages of communication with the interior of the main casing, one being vertical and offset from the plane of travel of the intake pockets, the other being inclined and disposed coincident to the plane of travel of the intake pockets, said rotor having elongated pockets diametrically opposite each other and offset from the intake pockets and at right angles thereto and designed to connect the intake manifold and said vertical passage to intermittently convey a motion producing means into the motive power chamber, and an exhaust manifold connected to the main casing.

2. In a rotary engine, the combination of a main casing and an auxiliary casing having a motive power chamber, of an intake manifold in communication with the interior of the main casing, a shaft, a tapered rotor carried by the shaft, and mounted revolubly in the main casing, said rotor having diametrically oppositely disposed intake pockets provided with an abutment wall and a plurality of different sized abutment blades arranged at different angles to each other, the foremost blade of each pocket being nearly vertical with the bottom of the pocket and each succeeding blade inclining more toward the bottom of the pocket with the angle of the last blade being the most acute, said main casing being tapered inside to receive the rotor, said motive power chamber having two passages of communication with the interior of the main casing, one being vertical and offset from the plane of travel of the intake pockets, the other being inclined and disposed coincident with the plane of travel of the intake pockets, said rotor having elongated pockets, diametrically opposite each other and offset from the intake pockets and at right angles thereto and designed to connect the intake manifold and said vertical passage to intermittently convey motion producing means into the motive power chamber, and an exhaust manifold connected to the main casing.

In testimony whereof I have signed my name to this specification in the presence of two subscribing witnesses.

ANDREW RASMUSEN, Jr.

Witnesses:
  F. E. Peake,
  R. C. Franks.